US010304133B2

(12) United States Patent
Newell et al.

(10) Patent No.: US 10,304,133 B2
(45) Date of Patent: *May 28, 2019

(54) DISTRIBUTION OF MARKET DATA

(71) Applicant: Chicago Mercantile Exchange Inc., Chicago, IL (US)

(72) Inventors: Ron Newell, Chicago, IL (US); Vijay Menon, Chicago, IL (US); Fred Malabre, Middletown, NJ (US); Joe Lobraco, Hoffman Estates, IL (US); Jim Northey, Houghton, MI (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/582,046

(22) Filed: Apr. 28, 2017

(65) Prior Publication Data

US 2017/0236205 A1 Aug. 17, 2017

Related U.S. Application Data

(63) Continuation of application No. 14/031,560, filed on Sep. 19, 2013, now Pat. No. 9,659,330, which is a
(Continued)

(51) Int. Cl.
*G06Q 30/06* (2012.01)
*G06Q 40/04* (2012.01)
(Continued)

(52) U.S. Cl.
CPC ............. *G06Q 40/04* (2013.01); *G06Q 20/10* (2013.01); *G06Q 30/0601* (2013.01);
(Continued)

(58) Field of Classification Search
CPC .... G06Q 40/04; G06Q 20/10; G06Q 30/0601; G06Q 30/0633; G06Q 40/00; G06Q 40/025; H04L 51/18
(Continued)

(56) References Cited

U.S. PATENT DOCUMENTS

| 4,093,823 A | 6/1978 | Chu |
| 5,297,032 A | 3/1994 | Trojan et al. |

(Continued)

FOREIGN PATENT DOCUMENTS

| EP | 0411748 A2 | 2/1991 |
| JP | 2002-183450 | 6/2002 |
| JP | 2002-183446 | 12/2002 |

OTHER PUBLICATIONS

"Message Encoding/Decoding Using Templated Parameters", Arun K. Nanda, et al., patent application 40 pages.
(Continued)

*Primary Examiner* — Eric W Stamber
*Assistant Examiner* — George H Walker, III
(74) *Attorney, Agent, or Firm* — Lempia Summerfield Katz LLC

(57) ABSTRACT

Systems and methods are provided for communicating and processing market data. The market data may comprise quotes, orders, trades and/or statistics. A messaging structure allows for adding, re-ordering and/or expanding data, within the printable character set of any language. One or more delimiters are defined and used to delimit data elements within the message structure. The data is interpreted based on templates which may be disseminated prior to the sending of messages and used as an abstraction so that the meaning of data need not be conveyed in the message.

20 Claims, 6 Drawing Sheets

Related U.S. Application Data continuation of application No. 13/680,708, filed on Nov. 19, 2012, now Pat. No. 8,560,443, which is a continuation of application No. 13/467,675, filed on May 9, 2012, now Pat. No. 8,341,056, which is a continuation of application No. 12/888,197, filed on Sep. 22, 2010, now Pat. No. 8,229,820, which is a continuation of application No. 10/982,535, filed on Nov. 5, 2004, now Pat. No. 7,831,491, which is a continuation-in-part of application No. 10/903,826, filed on Jul. 30, 2004, now abandoned.

(60) Provisional application No. 60/517,491, filed on Nov. 5, 2003.

(51) Int. Cl.
*G06Q 20/10* (2012.01)
*H04L 12/58* (2006.01)
*G06Q 40/02* (2012.01)
*G06Q 40/00* (2012.01)

(52) U.S. Cl.
CPC ......... *G06Q 30/0633* (2013.01); *G06Q 40/00* (2013.01); *G06Q 40/025* (2013.01); *H04L 51/18* (2013.01)

(58) Field of Classification Search
USPC ........................................ 705/7.11
See application file for complete search history.

(56) References Cited

U.S. PATENT DOCUMENTS

| | | | |
|---|---|---|---|
| 5,465,308 A * | 11/1995 | Hutcheson | G06K 9/00221 382/156 |
| 5,557,780 A * | 9/1996 | Edwards | G06F 17/2264 703/27 |
| 5,727,165 A | 3/1998 | Ordish et al. | |
| 5,909,570 A | 6/1999 | Webber | |
| 5,953,503 A | 9/1999 | Mitzenmacher et al. | |
| 6,031,577 A | 2/2000 | Ozkan et al. | |
| 6,088,699 A | 7/2000 | Gampper et al. | |
| 6,131,087 A | 10/2000 | Luke et al. | |
| 6,195,024 B1 | 2/2001 | Fallon | |
| 6,278,982 B1 * | 8/2001 | Korhammer | G06Q 40/04 705/36 R |
| 6,309,424 B1 | 10/2001 | Fallon | |
| 6,347,307 B1 | 2/2002 | Sandhu et al. | |
| 6,463,470 B1 | 10/2002 | Mohaban et al. | |
| 6,466,944 B1 | 10/2002 | Stokes | |
| 6,549,949 B1 * | 4/2003 | Bowman-Amuah | H04L 69/08 709/236 |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,694,054 B1 * | 2/2004 | Gardes | G06K 9/00476 382/181 |
| 6,748,457 B2 | 6/2004 | Fallon et al. | |
| 6,801,201 B2 * | 10/2004 | Escher | G06N 3/126 705/36 R |
| 6,950,445 B2 | 9/2005 | Svanbro et al. | |
| 6,963,855 B1 * | 11/2005 | Borzenko | G06Q 40/04 705/37 |
| 7,082,398 B1 * | 7/2006 | Apple | G06Q 30/02 340/4.5 |
| 7,130,913 B2 | 10/2006 | Fallon | |
| 7,143,191 B2 * | 11/2006 | Chuah | H03M 7/3088 709/247 |
| 7,161,506 B2 | 1/2007 | Fallon | |
| 7,181,608 B2 | 2/2007 | Fallon et al. | |
| 7,228,129 B1 | 6/2007 | Ward et al. | |
| 7,321,873 B2 | 1/2008 | Reuter et al. | |
| 7,321,937 B2 | 1/2008 | Fallon | |
| 7,352,300 B2 | 4/2008 | Fallon | |
| 7,358,867 B2 | 4/2008 | Fallon | |
| 7,376,772 B2 | 5/2008 | Fallon | |
| 7,378,992 B2 | 5/2008 | Fallon | |
| 7,386,046 B2 | 6/2008 | Fallon et al. | |
| 7,395,345 B2 | 7/2008 | Fallon | |
| 7,400,274 B2 | 7/2008 | Fallon et al. | |
| 7,415,530 B2 | 8/2008 | Fallon | |
| 7,417,568 B2 | 8/2008 | Fallon et al. | |
| 7,552,077 B1 * | 6/2009 | Schluetter | G06Q 40/00 705/35 |
| 7,565,319 B1 * | 7/2009 | Strauss | G06Q 10/04 705/37 |
| 7,685,049 B1 * | 3/2010 | Singer | G06Q 20/042 705/37 |
| 7,831,491 B2 | 11/2010 | Newell et al. | |
| 7,899,749 B1 | 3/2011 | Studnitzer et al. | |
| 8,036,929 B1 | 10/2011 | Reisman | |
| 8,041,626 B2 * | 10/2011 | Kirwin | G06F 3/04895 705/37 |
| 8,060,435 B2 | 11/2011 | Kirwin et al. | |
| 8,131,625 B2 | 3/2012 | Langridge | |
| 8,266,040 B2 | 9/2012 | Segal et al. | |
| 2001/0047473 A1 | 11/2001 | Fallon | |
| 2001/0052038 A1 | 12/2001 | Fallon et al. | |
| 2002/0004774 A1 | 1/2002 | Defarlo | |
| 2002/0038276 A1 * | 3/2002 | Buhannic | G06Q 10/10 705/37 |
| 2002/0038279 A1 | 3/2002 | Samuelson et al. | |
| 2002/0052816 A1 | 5/2002 | Clenaghan et al. | |
| 2002/0080871 A1 | 6/2002 | Fallon et al. | |
| 2002/0110120 A1 | 8/2002 | Hagglund et al. | |
| 2002/0120546 A1 | 8/2002 | Zajac | |
| 2002/0128938 A1 * | 9/2002 | Ronald Schofield | G06Q 30/06 705/35 |
| 2002/0128958 A1 * | 9/2002 | Slone | G06Q 40/04 705/37 |
| 2002/0141449 A1 | 10/2002 | Johnson | |
| 2002/0191692 A1 | 12/2002 | Fallon et al. | |
| 2003/0009411 A1 * | 1/2003 | Ram | G06F 17/246 705/37 |
| 2003/0033212 A1 | 2/2003 | Sandhu et al. | |
| 2003/0033240 A1 | 2/2003 | Balson et al. | |
| 2003/0093351 A1 | 5/2003 | Sarabanchong | |
| 2003/0167223 A1 | 9/2003 | Pledereder et al. | |
| 2003/0225674 A1 | 12/2003 | Hughes et al. | |
| 2003/0225857 A1 | 12/2003 | Flynn et al. | |
| 2004/0042506 A1 * | 3/2004 | Fallon | G06Q 40/04 370/521 |
| 2004/0044608 A1 | 3/2004 | Young | |
| 2004/0068461 A1 * | 4/2004 | Schluetter | G06Q 20/10 705/37 |
| 2004/0107123 A1 | 6/2004 | Haffner et al. | |
| 2004/0143538 A1 | 7/2004 | Korhammer et al. | |
| 2004/0230660 A1 | 11/2004 | Abjanic et al. | |
| 2004/0240486 A1 | 12/2004 | Venkatesh et al. | |
| 2005/0228735 A1 * | 10/2005 | Duquette | G06Q 40/04 705/37 |
| 2006/0069635 A1 | 3/2006 | Ram et al. | |
| 2006/0095360 A1 | 5/2006 | Apple et al. | |
| 2006/0184447 A1 | 8/2006 | Nieboer et al. | |
| 2007/0011226 A1 | 1/2007 | Hinni et al. | |
| 2007/0043939 A1 | 2/2007 | Fallon et al. | |
| 2007/0050514 A1 | 3/2007 | Fallon | |
| 2007/0050515 A1 | 3/2007 | Fallon | |
| 2007/0067483 A1 | 3/2007 | Fallon | |
| 2007/0083746 A1 | 4/2007 | Fallon et al. | |
| 2007/0174209 A1 | 7/2007 | Fallon et al. | |
| 2008/0232457 A1 | 9/2008 | Fallon et al. | |
| 2009/0076940 A1 | 3/2009 | Patel et al. | |
| 2009/0154545 A1 | 6/2009 | Fallon et al. | |

(56) References Cited

U.S. PATENT DOCUMENTS

OTHER PUBLICATIONS

Larry L. Peterson & Bruce S. Davie, "Computer Networks A Systems Approach", ISBN 1-55860-368-9, 1996, 25 pages.

* cited by examiner

| Normalized Sample (field delimiter: \|, group start: [, group end: ])  A\|B{C\|D{E}\|F\|G}H | | | | |
|---|---|---|---|---|
| Unique Delimiters | Field Delimiter | Group Start | Group End | Sample | Notes |
| 1 | \| | [ | ] | A\|B\|C\|D\|E\|F\|G\|H | In order to locate repeating groups, a receiver will require knowledge of which keys make up these groups. |
| 1 | \| | [[ | ]] | A\|B\|C\|D\|E\|\|\|F\|G\|\|H | |
| 2 | \| | [[[ | ]]] | A\|B\|C\|D\|E\|[[[F\|G[[H | These are effectively the same option; all that is changing is which character is used as a multiple and to indicate which delimiter. |
| 2 | \| | [[ | ]] | A\|B\|C\|D\|E\|[F\|G\|H | |
| 2 | \| | [ | ] | A\|B\|C\|D\|E\|[F\|G\|H | |
| 3 | \| | [ | ] | A\|B\|C\|D\|E\|]F\|G]H | |

Figure 3

Normalized Sample (field delimiter: |, group;start: {, group end: }, group delimiter: ^)
A|B|C|D|{E^F^G}|M|{}|}

| Unique Delimiters | Field Delimiter | Group Start | Group Delimiter | Group End | Sample | Optional Fields | Repeating Group Occurrence/Count Req'd = required Rec'd = recommended | Notes |
|---|---|---|---|---|---|---|---|---|
| 1 | \| | [ | ; | ] | A\|B\|C\|D\|E\|F\|G\|H\|\|\|J | Fields are optional at the end of a message. Optional fields in the middle of a message can be indicated by two consecutive field delimiters or a protocol specific null value indicator. | Req'd | Will need template in order to parse if repeating groups exist in the message. |
| 1 | \| | [ | ~ | ] | A\|B\|C\|D\|E\|F\|G\|H\|\|\|J | Fields are optional at the end of a message. Optional fields in the middle of a message can be indicated by two consecutive field delimiters or a protocol specific null value indicator. | Rec'd | |
| 2 | \| | [ | ; | ] | A\|B\|C\|D\|E\|F\|G\|\|H\|\|\|J | Fields are optional at the end of a message. Optional fields in the middle of a message can be indicated by two consecutive field delimiters or a protocol specific null value indicator. | Req'd | Will need template in order to parse if repeating groups exist in the message. |
| 2 | \| | [ | ; | ] | A\|B\|C\|D\|E\|F\|F\|G\|\|H\|\|\|J | Fields are optional at the end of a message. Optional fields in the middle of a message can be indicated by two consecutive field delimiters or a protocol specific null value indicator. | Rec'd | There are many variations of this. All that changes is which character is used as a multiple and to indicate which delimiter. See the template options table for a similar example. |
| 3 | \| | [ | ~ | ] | A\|B\|C\|D\|E\|F\|G\|\|H\|\|\|J | Fields are optional at the end of a message. Optional fields in the middle of a message can be indicated by two consecutive field delimiters or a protocol specific null value indicator. | Rec'd | |
| 4 | \| | [ | ~ | ] | A\|B\|C\|D\|E^F^G\|^H\|\|\|J | Fields are optional at the end of a message. Optional fields in the middle of a message can be indicated by two consecutive field delimiters or a protocol specific null value indicator. | | |

Figure 4

DISTRIBUTION OF MARKET DATA

CROSS-REFERENCE TO RELATED APPLICATIONS

The present application is a continuation of U.S. application Ser. No. 14/031,560, filed Sep. 19, 2013 entitled "Distribution of Market Data," now U.S. Pat. No. 9,659,330, which is a continuation of U.S. application Ser. No. 13/680,708, filed Nov. 19, 2012 entitled "Distribution of Market Data," now U.S. Pat. No. 8,560,443, which is a continuation of U.S. application Ser. No. 13/467,675, filed May 9, 2012 entitled "Market Data Message Format," now U.S. Pat. No. 8,341,056, which is a continuation of U.S. application Ser. No. 12/888,197, filed Sep. 22, 2010 entitled "Market Data Message Format," now U.S. Pat. No. 8,229,820, which is a continuation of U.S. application Ser. No. 10/982,535, filed Nov. 5, 2004 entitled "Market Data Message Format," now U.S. Pat. No. 7,831,491, which is a continuation-in part of U.S. application Ser. No. 10/903,826 filed Jul. 30, 2004 entitled "Trade Engine Processing of Mass Quote Messages and Resulting Production of Market Data", which claimed priority to U.S. Provisional Patent Application No. 60/517,491 filed Nov. 5, 2003 entitled "Delimited Variable Length Structure for Electronic Messages" the entire disclosures are hereby incorporated by reference.

FIELD OF THE INVENTION

Aspects of the present invention relate to a delimited message format that uses delimiters to demarcate data and repeating groups of data sent from an exchange or received by an exchange.

BACKGROUND

As the number of orders and trades increases, the distribution of messages can strain computer systems and networks that are used to transmit such messages. The processing of numerous messages and associated overhead consumes bandwidth and processing time. Current messaging structures use fixed length, key-value paired, and/or message mockup structures to communicate content. These current messaging structures are inefficient due to overhead associated with padding extra bytes or use of keys or references which may be contained in the message. Therefore, there is a need in the art for an improved electronic message structure.

SUMMARY OF THE INVENTION

Aspects of the invention overcomes at least the problems and limitations of the prior art by providing systems and methods for processing market data through the use of a messaging structure. The messaging structure may use delimiters to demarcate data and repeating groups of data. The delimiters may be single-byte control characters that allow data to be extracted using a parsing logic. A parsing algorithm may require that bytes in a message be read in order to locate the delimiters. The message structure may use templates to define message types, data meaning, and data ordering. The template may be disseminated prior to the sending of messages and used as an abstraction so that the meaning of data need not be conveyed in the message. The created messages may present data in the order stipulated by the templates. An application processing the messages may map data to a template and associate it with meaning. The template may be disseminated prior to the sending of messages and used as an abstraction so that the meaning of data need not be conveyed in the message. The use of templates may allow data to be added, deleted, or re-ordered by first distributing an updated template.

The processing of market messages may be accomplished in accordance with the techniques described in U.S. provisional patent application No. 60/517,491. In various embodiments, aspects of the present invention can be partially or wholly implemented on a computer-readable medium, for example, by storing computer-executable instructions or modules, or by utilizing computer-readable data structures. Of course, the methods and systems disclosed herein may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 illustrates various delimiters utilized in templates and data messages in accordance with an embodiment of the invention;

FIG. 4 illustrates additional delimiters utilized in templates and data messages in accordance with an embodiment of the invention;

DETAILED DESCRIPTION

Exemplary Operating Environment

Figure 1:
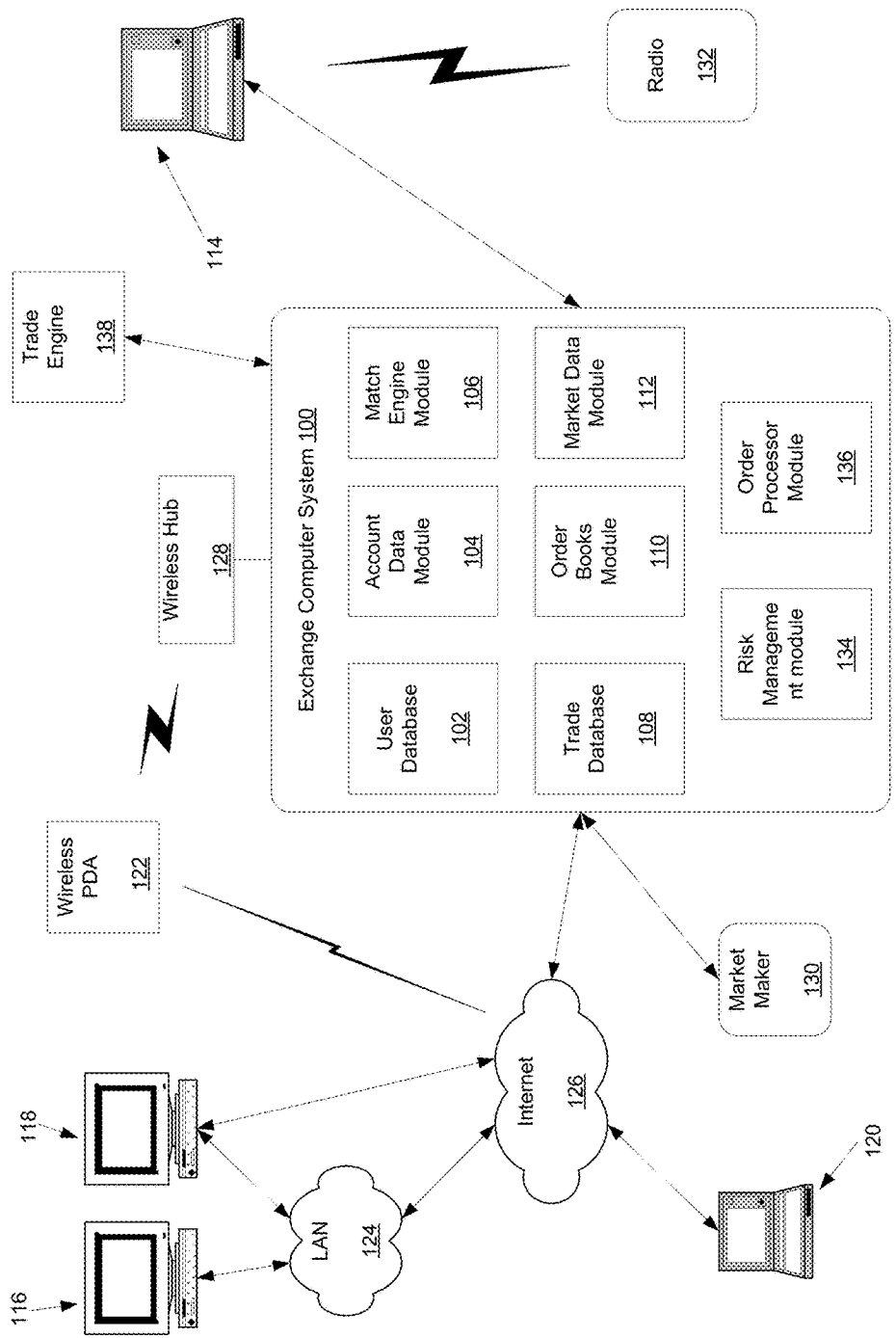
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Market Data Messaging Format

A new messaging structure 200 (FIG. 2) for communicating electronic data of any nature within the printable character set of any language is described. Meaning may be associated with actual message content without including any keys in the actual messages or requiring any kind of positional references to data in the messages. This approach supports flat message structures, as well as nested groups of repeatable data to any level of nested depth. A financial data message may comprise a market data message sent from an exchange and/or orders or messages delivered to an exchange.

Figure 2:
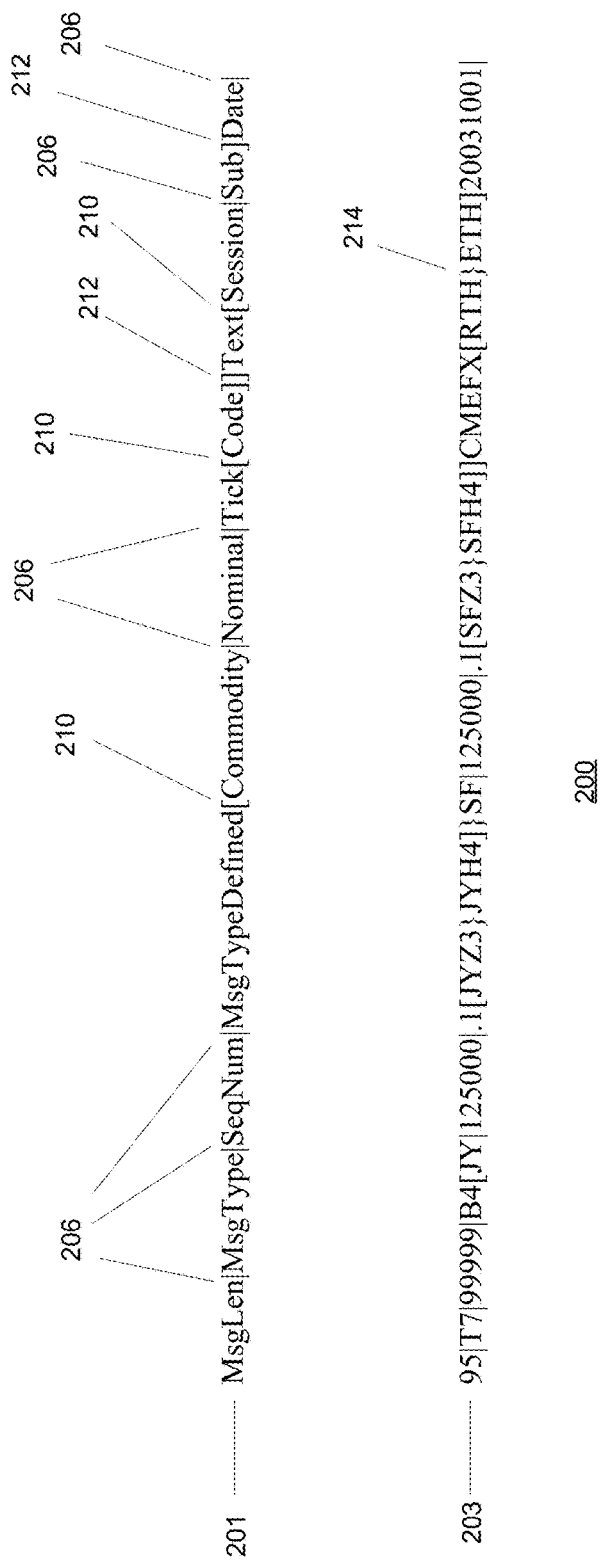
FIG. 2 shows an embodiment of the messaging structure in accordance with an embodiment of the invention.

FIG. 2 illustrates one embodiment of messaging structure 200. In FIG. 2, a template 201 and a message 203 are illustrated. As shown in FIG. 2, the message structure 200 may consist of delimiters to demarcate each attribute so that datum can be easily extracted. Templates such as template 201 may predefine an attribute order so that extracted datum can be associated with meaning. The use of delimiters and templates in messaging structure 200 may enable the messaging structure to be readily extensible.

Character "|" 206 is used to denote a delimiter in an embodiment of the invention. Those skilled in the art will realize that many other additional characters may be utilized to represent a delimiter such as characters "[" 210 and "]" 212 and "}" 214. The delimiters may separate data elements within a given message structure. One or more templates such as template 201 may be defined and disseminated to 1) indicate the number and nature of supported message structures (flat or nested groups of repeatable data), as well as 2) the meaning of the data that may be communicated within a given message structure. The delimiters used may or may not be communicated in the templates, as well. One or more message structures corresponding to each template may be defined and disseminated, carrying actual or meaningful content.

FIGS. 3 and 4 illustrate various options for delimiters to be used in messaging structure 200 of the present invention. Those skilled in the art will realize that FIGS. 3 and 4 are not an exhaustive list of the various delimiters choices but are only an illustrative list. For example, FIGS. 3 and 4 may contain other options and may map to other options (not shown) using varying multiples of characters to represent the four illustrated delimiters. The use of multiple characters for delimiters may be less efficient but semantically the same as the options illustrated in FIGS. 3 and 4.

FIGS. 3 and 4 include a unique delimiters column 302 which may indicate the number of unique characters used to build delimiters. Some of the various options may use multiple consecutive occurrences of one character to form a delimiter. The choice of delimiter characters may not change the format or the messaging structure 200. Considerations such as printability and character set may affect the actual characters and encoding chosen. For each alternative presented, a printable character may be chosen to represent each of the delimiters. Each table in both FIGS. 3 and 4 includes a "Field Delimiter" column 304, a "Group Start" column 306, a "Group End" column 308, a "Sample" column 310, and a "Notes" column 312. The "Sample" column 310 may include a normalized sample. The sample may be translated into its form for each alternative presented. In addition, FIG. 4 also includes a "Group Delimiter" column 314, "Options Fields" column 316, and a "Repeating Group Column" 318.

In many of the alternatives listed in FIGS. 3 and 4, the "Group End" 308 characters and the "Group Delimiter" 314 characters are the same. A field outside the repeating group in question specifies the number of occurrences of the group. This may allow a parsing algorithm to take advantage of the predictive nature of these tags because they may not be able to depend on the delimiters themselves to uniquely demarcate message structure. In some cases these fields may be necessary in order to parse the message.

The "Options Fields" 316 shown in FIG. 4 may be attached at the end of data messages. The "Options Fields" 316 may also be found at the end of repeating groups in data messages or at other places in a message and/or repeating groups in data messages.

The delimiters defined in FIGS. 3 and 4 may be used to demarcate attributes and repeating groups. The utilization of four delimiters is deemed optimal such as "Field Delimiter" 304, "Group Start" 306 delimiter, "Group Delimiter" 314, and "Group End" 308 delimiter. The use of four delimiters may be optimal because: 1) counts for the number of times a group repeats may not be needed thus saving bytes and simplifying the parsing algorithm; 2) delimiters at the end of repeating groups may be dropped if no data is present; 3) the parsing algorithm to extract datum may be generic for all messages; and 4) any message may be parsed without reference to message types.

Delimiters and templates may be disseminated or communicated by any means that allow them to be incorporated in an electronic system. The message structures then disseminated may be of variable length with data elements shortened or extended in length, as well as included or not present on a real-time per message basis. Message structures, depending on the choice of implementation, may be parsed without prior knowledge of the message content, without references or keys to the content, and/or without fixed positional reference to the message structures.

One or more templates such as template 201 may be defined and disseminated to 1) indicate the number and nature of supported messages (linear or nested groups), as well as 2) indicate the meaning of the data that may be communicated within a given type of message. Templates may allow datum to be associated with meaning by 1) defining the attributes, and 2) indicating the order in which they will appear. The use of delimiters within a given message type may also be communicated in its template.

Once the templates have been disseminated, messages corresponding to each template may be built and disseminated, carrying actual content. The messages may be of variable length with data elements shortened or extended in length, as well as included or not present on a real-time basis. Templates, and thus messages, may be changed on-the-fly so that attributes can be added, deleted, and/or re-order as needed. Template and message integrity may be checked per instance of receipt by validating message size.

In one embodiment of the invention, the messaging format detailed assumes the following: 1) messages are being passed from a sender to one or more receivers; 2) the method of dissemination is variable; 3) two fundamental types of messages are sent, templates and data messages; 4) the data being sent can be represented in key=value pairs; 5) templates define the order of data in data messages; 6) templates contain keys and data messages contain associated values; and 7) a protocol that uses this formatting scheme will provide needed functionality as necessary (such as including a mechanism by which to match a data message with a template or including a mechanism to verify message contents).

A message may consist, conceptually, of fields and repeating groups. Repeating groups may be nested and also consist of fields and repeating groups. In templates, a repeating group may only exist once. In messages, a repeating group may occur multiple times. All these occurrences may be consecutive.

As discussed above, messages may consist, structurally, of fields and delimiters. Every field may be followed by one or more delimiters. Field delimiters may separate fields within a group or in the message. If the last element of a message is not a repeating group, it may be followed by a "Field Delimiter" 304; otherwise it may be followed by the "Group End" 308 delimiter. "Group Start" 306 delimiters may mark the beginning of a group definition in a template and a repeating group in a data message. "Group Delimiters" 314 do not exist in templates and separate occurrences of a repeating group in data messages. "Group End" 308 delimiters may mark the end of a repeating group and may be placed after the last element of the last occurrence of a repeating group. Every "Group Start" 306 delimiter may be matched by a "Group End" 308 delimiter later in the message.

Message structure 200 may perform several functions such as: 1) order attributes which convey data; 2) it provides a means for extracting specific datum from the overall message; and/or 3) provide a method for associating the datum with meaning. Optimizing a message structure, therefore, involves ordering attributes in an efficient manner while allowing datum to be extracted and associated with meaning in a likewise efficient manner. An optimized message structure, moreover, may readily allow attributes to be added, deleted or re-ordered, as well as efficiently handle attributes which either may not be present or vary in length on a per message basis.

A fully optimized message structure may communicate only meaningful content in a format that expresses the data in the smallest possible size. A structure for stating price, for example, may only state the price without overhead. The format for stating the price, moreover, might be optimized by expressing it as a binary rather than string statement.

Message structure 200 orders attributes in a very efficient manner. Message Structure 200 may use delimiters to demarcate each attribute so datum can be readily extracted. Message structure 200 may use templates to pre-define attribute ordering so extracted datum can be associated with meaning.

Message structure 200 may carry data within the printable character set of any language. Message structure 200 supports linear strings of data, as well as nested groups of repeatable data to any level of nested depth. Ordering of attributes may be determined by at least four factors: 1) attributes which are potentially repeatable to optimize efficiency are placed in repeating groups; 2) repeating groups are nested so that common data resides in the outer most group(s) and unique data resides in the inner most group(s); 3) data common to the entire message resides outside any repeating group; 4) attributes which may not appear often are placed at the end of a repeating group or at the end of the message. The last factor may allow delimiters for those attributes without values in a given instance to be dropped.

Template and message integrity may be checked per instance of receipt by validating message size. Messages may be further validated against the structure of its corresponding template.

The advantages of the delimited structure may include: 1) efficient message structure that produces message sizes comparable to or better than an optimized fixed length structure; 2) retains the flexibility of key-value and mockup structures for adding, re-ordering and extending the length of data elements contained in messages; 3) supports linear data strings, as well as nested groups of repeatable data to any level of nested depth. It excels at communicating data via complex nested groups which optimize message size efficiency; 4) attributes can be added, deleted, and/or re-order on-the-fly by defining and disseminating a template and then sending messages corresponding to the given template; 5) attributes can be shortened or extended in length, as well as included or not present on a real-time per message basis; 6) messages can be parsed without prior knowledge of the message type, as well as without references or keys to the content; 7) any number of templates and/or message types can be defined, and any nature of data within the printable character set of any language can be communicated; and 8) it is easier to optimize both up-front and over time than a fixed length structure.

A further advantage of the delimited structure may include a variable length message structure that consumes no more bytes than: 1) for linear data strings, the number of bytes used for actual data plus one byte per delimiter in a given message; or 2) for nested message structures, the same number of bytes as above plus potentially X number of bytes to close each nested group of data.

Weaknesses of fixed length message structures include the use of padding to accommodate attributes which either may not be present or vary in length on a per message basis. Each attribute must be padded to a fixed length equal to the longest possible value the attribute might convey. This is needed to maintain a consistent overall fixed length structure (or consistent fixed length partitions for repeating groups) so that datum can be extracted using a pre-defined set of positional references. The fixed length structure, therefore, also suffers from not being readily extensible.

Thus, a fixed length structure would optimally state instrument, price and quantity as:

ESZ31075005 and no structure could better optimize the message. It is improbable, however, that a fixed length structure can be as optimized as in the example given above. Because the attributes vary in length on a per message basis, they will have to be padded:

ESZ3—0010750000005.

Thus, the fixed length message size is inflated by a total of 11 unneeded characters in this instance.

If the delimited structure described above is used instead:

ESZ3|107500|5|
ESV3C1060|1040|5|

This structure incurs an overhead of 3 control characters for delimiters and improves upon the fixed length example where padding is added.

From the perspective of optimizing message size, however, the delimited structure may be ultimately deemed equal to the use of an optimized fix length structure when the structures do not include repeating groups of data. The constraints may include: 1) the more attributes with values that will vary in length as well as the more attributes that will not be present in every instance, the more efficient the delimited structure will be; and 2) the more attributes with values of constant length and always present the more efficient the fixed length structure will be.

The following examples compare messages which communicate date and time, trading system, trading mode, instrument, price, quantity, price variation, order type, and origin:

20031015153015999GOESZ3—00107500000005+L4 pads with 11 characters

20031015153015999|G|O|ESZ3|107500|5|+|L|4| incurs 9 delimiters

When linear strings are thus compared, the two approaches are generally equal with respect to message size. The delimited structure, however, will perform better than the fixed length structure when repeating groups are introduced. Also, the fixed length structure must always be optimized—attributes efficiently ordered and padding kept to a minimum—if it is to perform well.

Figure 5:
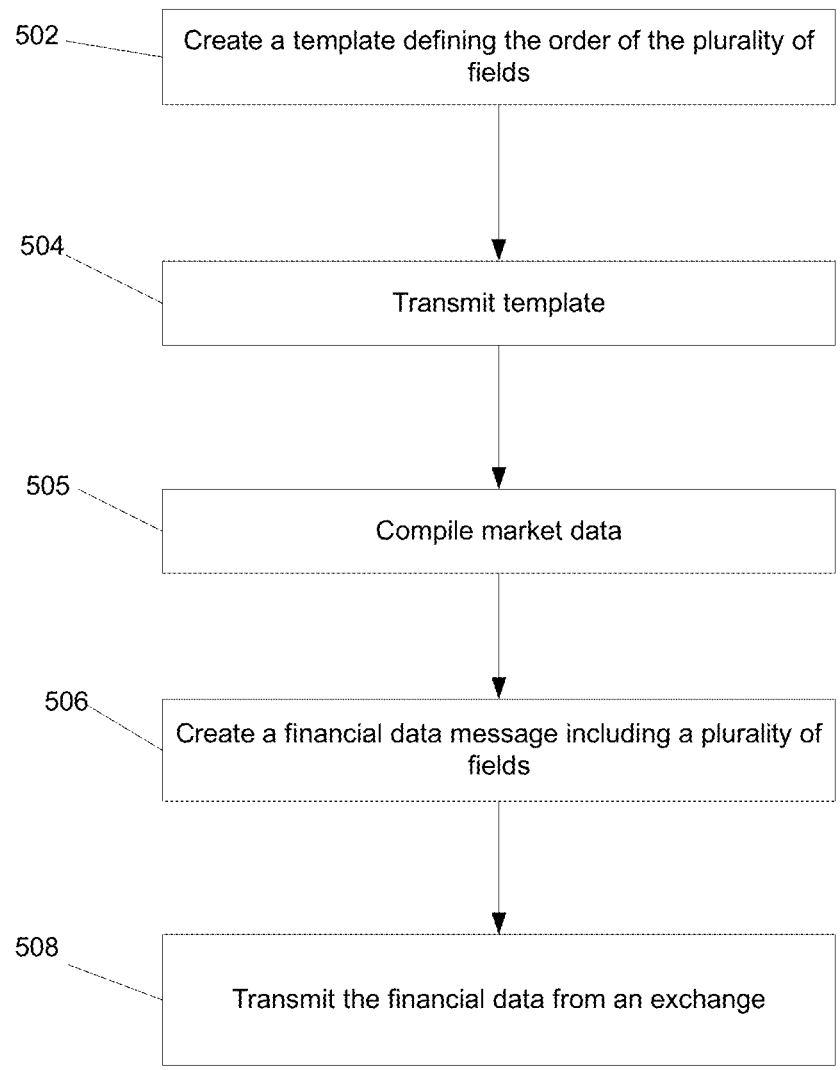
FIG. 5 illustrates a computer implemented method of a creating messaging structure in accordance with an embodiment of the invention.

FIG. 5 illustrates a computer a messaging structure in accordance with an embodiment of the invention. First, in step 502 a template is created that defines the order of the plurality of fields. Next, in step 504 the template may be transmitted though a network as illustrated in FIG. 1. The market data to be transmitted may be compiled in step 505. The market data may include a plurality of financial information such as orders, quotes or mass quotes, trades, and statistics. The financial information may include derivate products. Derivative products may include options on futures contracts, futures contracts, future contracts that are functions of or related to other futures contracts, or other financial instruments that have their price related to or derived from an underlying product.

A financial data message may be created in step 506. The financial data message may comprise a market data message sent from an exchange and/or orders or messages delivered to an exchange. The financial data message includes a plurality of fields that have been separated by delimiters. The delimiters may include at least one delimiter that is used to identify a repeated group of information. Finally, in step 508 the financial data message may be transmitted from an exchange or similar system. The transmission may be across one or more computer, audio, video or data networks.

Figure 6:
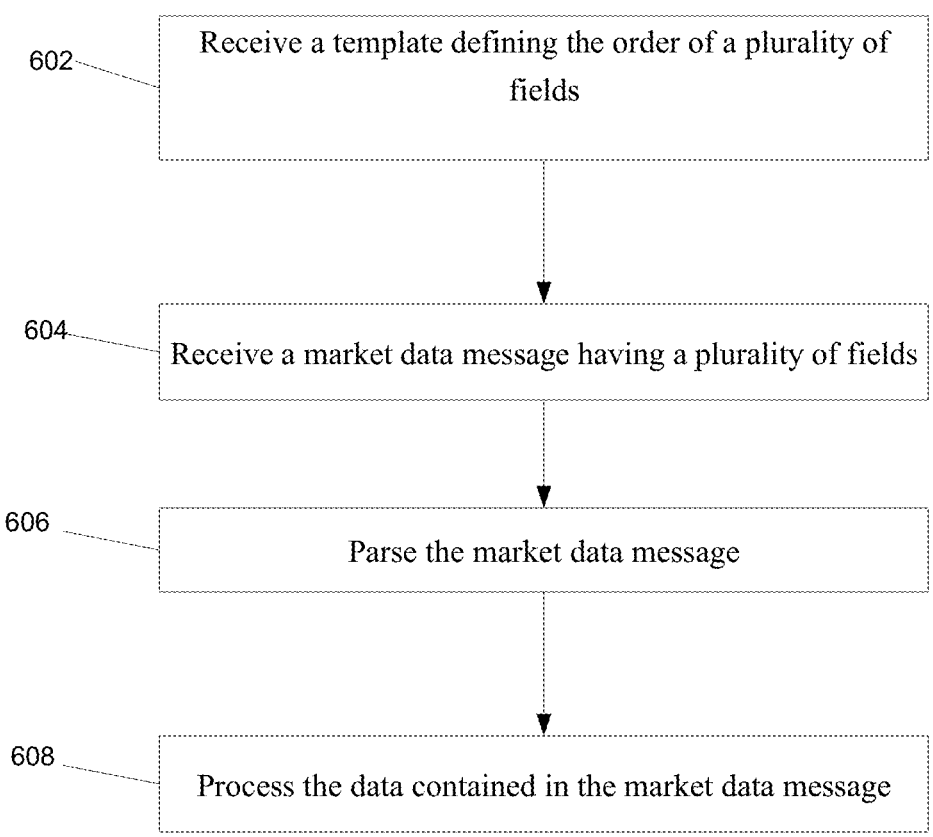
FIG. 6 illustrates a computer implemented method of processing market data in accordance with an embodiment of the invention.

FIG. 6 illustrates a computer implemented method of processing a market data message having a plurality of fields separated by delimiters in accordance with an aspect of the invention. In step 602, a template may be received. The template may define the order of the plurality of fields of the market data message. Next, in step 604 a market data message may also be received. The market data message may include a plurality of fields separated by delimiters. The source of the market data message may be the same as the source of the template. In step 606, the market data message may be parsed to extract the fields separated by the delimiters. The data extracted from the market data message may include market data containing a plurality of orders for financial instruments. Finally, in step 608 the data in the market data message may be interpreted based information such as order information included in the template.

The embodiments described above utilize market data. In alternative embodiments individual orders and quotes may use the same message structure. The messaging structure 200 of the present invention may be used in the processing of market data. The market data may contain a plurality of orders for financial instruments. The financial instruments may be derivative products. Derivative products may include options on futures contracts, futures contracts that are functions of or related to other futures contracts, or other financial instruments that have their price related to or derived from an underlying product. These market data may be received at an exchange that receives and executes orders.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:

1. A method of distributing market data over a network from a sender to a plurality of receivers, the method comprising:
    (a) creating at a computer device in real time and on a per message basis a plurality of extensible templates that each that defines a variable length message structure and includes at least one delimiter that is used to identify a repeated group of information and a field outside of a repeating group that specifies the number of occurrences of the group;
    (b) building at a computer device a plurality of market data messages that each include variable length fields separated by delimiters and an identification of one of the plurality of extensible templates that defines the message structure used in the message;
    (c) disseminating by the sender over the network a first one of the plurality of extensible templates; and
    (d) disseminating by the sender over the network a first market data message that identifies and is structured in accordance with the first one of the plurality of extensible templates;
    wherein the computer device in (a) creates the plurality of extensible templates on-the-fly so that attributes can be added and deleted.

2. The method of claim 1, wherein at least one delimiter is used to identify a repeated group in a template.

3. The method of claim 1, wherein (b) comprises building a market data message that includes a price in a binary code format.

4. The method of claim 1, wherein the computer device in (a) comprises an exchange computer system.

5. The method of claim 1, wherein the computer device in (b) comprises an exchange computer system.

6. The method of claim 1, wherein (b) comprises building a market data message that includes data in a printable character set format.

7. The method of claim 1, wherein (b) comprises building a market data message that includes a plurality of orders for financial instruments.

8. The method of claim 1, wherein (b) comprises building a market data message that includes a mass quote.

9. The method of claim 1, wherein (b) comprises building a market data message that includes statistics.

10. The method of claim 1, wherein (b) comprises building a market data message that includes a mass quote.

11. The method of claim 1, wherein (b) comprises building a market data message that includes statistics.

12. A computer system configured to distribute market data, the system comprising:
    a processor;
    a computer-readable medium containing computer-executable instructions that, when executed by the processor, cause the system to perform steps comprising:
        (a) creating on the fly and on a per message basis a plurality of extensible templates that each that defines a variable length message structure and includes at least one delimiter that is used to identify a repeated group of information and a field outside of a repeating group that specifies the number of occurrences of the group;
        (b) building a plurality of market data messages that each include variable length fields separated by delimiters and an identification of one of the plurality of extensible templates that defines the message structure used in the message;
        (c) disseminating a first one of the plurality of extensible templates; and
        (d) disseminating a first market data message that identifies and is structured in accordance with the first one of the plurality of extensible templates.

13. The system of claim 12, wherein at least one delimiter is used to identify a repeated group in a template.

14. The system of claim 12, wherein the processor comprises part of an exchange computer system.

15. The system of claim 12, wherein (b) comprises building a market data message that includes a price in a binary code format.

16. The system of claim 12, wherein (b) comprises building a market data message that includes data in a printable character set format.

17. The system of claim 12, wherein (b) comprises building a market data message that includes a plurality of orders for financial instruments.

18. A non-transitory computer-readable medium containing computer-executable instructions that, when executed by a processor, cause a computer system to perform the steps comprising:
    (a) creating on the fly and on a per message basis device a plurality of extensible templates that each that defines a variable length message structure and includes at least one delimiter that is used to identify a repeated group of information and a field outside of a repeating group that specifies the number of occurrences of the group;
    (b) building a plurality of market data messages that each include variable length fields separated by delimiters and an identification of one of the plurality of extensible templates that defines the message structure used in the message;
    (c) disseminating a first one of the plurality of extensible templates; and
    (d) disseminating a first market data message that identifies and is structured in accordance with the first one of the plurality of extensible templates.

19. The non-transitory computer-readable medium of claim 18, wherein (b) comprises building a market data message that includes a plurality of orders for financial instruments.

20. The non-transitory computer-readable medium of claim 18, wherein (b) comprises building a market data message that includes a mass quote.

* * * * *